United States Patent [19]
Sasaki

[11] Patent Number: 6,061,497
[45] Date of Patent: May 9, 2000

[54] VIDEO SIGNAL RECORDING APPARATUS

[75] Inventor: Takayuki Sasaki, Kanagawa, Japan

[73] Assignee: Sony Corporation, Tokyo, Japan

[21] Appl. No.: 08/174,423

[22] Filed: Dec. 28, 1993

Related U.S. Application Data

[63] Continuation of application No. 07/660,957, Feb. 26, 1991, abandoned.

[30] Foreign Application Priority Data

Feb. 27, 1990 [JP] Japan ................................. 2-46816

[51] Int. Cl.[7] ..................................................... H04N 5/91
[52] U.S. Cl. ........................................... 386/120; 358/906
[58] Field of Search .................................. 358/310, 320, 358/321, 311, 341, 343, 906, 909.1; 360/33.1, 18, 19.1; 386/120–121, 95–96, 107, 117, 38; H04N 5/76, 5/91, 9/79

[56] References Cited

U.S. PATENT DOCUMENTS

| | | | |
|---|---|---|---|
| 4,365,273 | 12/1982 | Yamada et al. | 358/133 |
| 4,398,217 | 8/1983 | Peters | 358/133 |
| 4,546,390 | 10/1985 | Konishi et al. | 360/10.3 |
| 4,575,772 | 3/1986 | Shimada et al. | 358/335 |
| 4,858,032 | 8/1989 | Okada et al. | 358/310 |
| 4,907,181 | 3/1990 | Hedtke et al. | 360/32 |
| 5,027,222 | 6/1991 | Shinbo et al. | 358/330 |
| 5,065,259 | 11/1991 | Kubota et al. | 358/310 |
| 5,093,732 | 3/1992 | Yoshinaka | 360/36.2 |
| 5,202,798 | 4/1993 | Takei et al. | 358/906 |
| 5,461,485 | 10/1995 | Nagashima et al. | 358/335 |

FOREIGN PATENT DOCUMENTS

| | | |
|---|---|---|
| 0 129 122 | 12/1984 | European Pat. Off. . |
| 0 202 009 | 11/1986 | European Pat. Off. . |
| 0 253 192 | 1/1988 | European Pat. Off. . |
| 0 323 194 | 7/1989 | European Pat. Off. . |
| 0 405 491 | 1/1991 | European Pat. Off. . |
| 0 439 132 | 7/1991 | European Pat. Off. . |
| 62-033371 | 2/1987 | Japan . |

*Primary Examiner*—Thai Tran
*Assistant Examiner*—Vincent F. Boccio
*Attorney, Agent, or Firm*—Hill & Simpson

[57] ABSTRACT

A video signal recording and reproducing apparatus capable of recording and reproducing a video signal of a still picture. The video signal recording apparatus includes an image memory for storing a digital signal of a still picture, a memory controller for controlling the image memory, a parallel serial converter for converting parallel data of the digital signal of a still picture read out from the image memory to serial data, a digital data processor for processing the converted serial data, and a transducer for transducing the processed serial data to suitable form to be recorded on a predetermined recording medium.

6 Claims, 5 Drawing Sheets

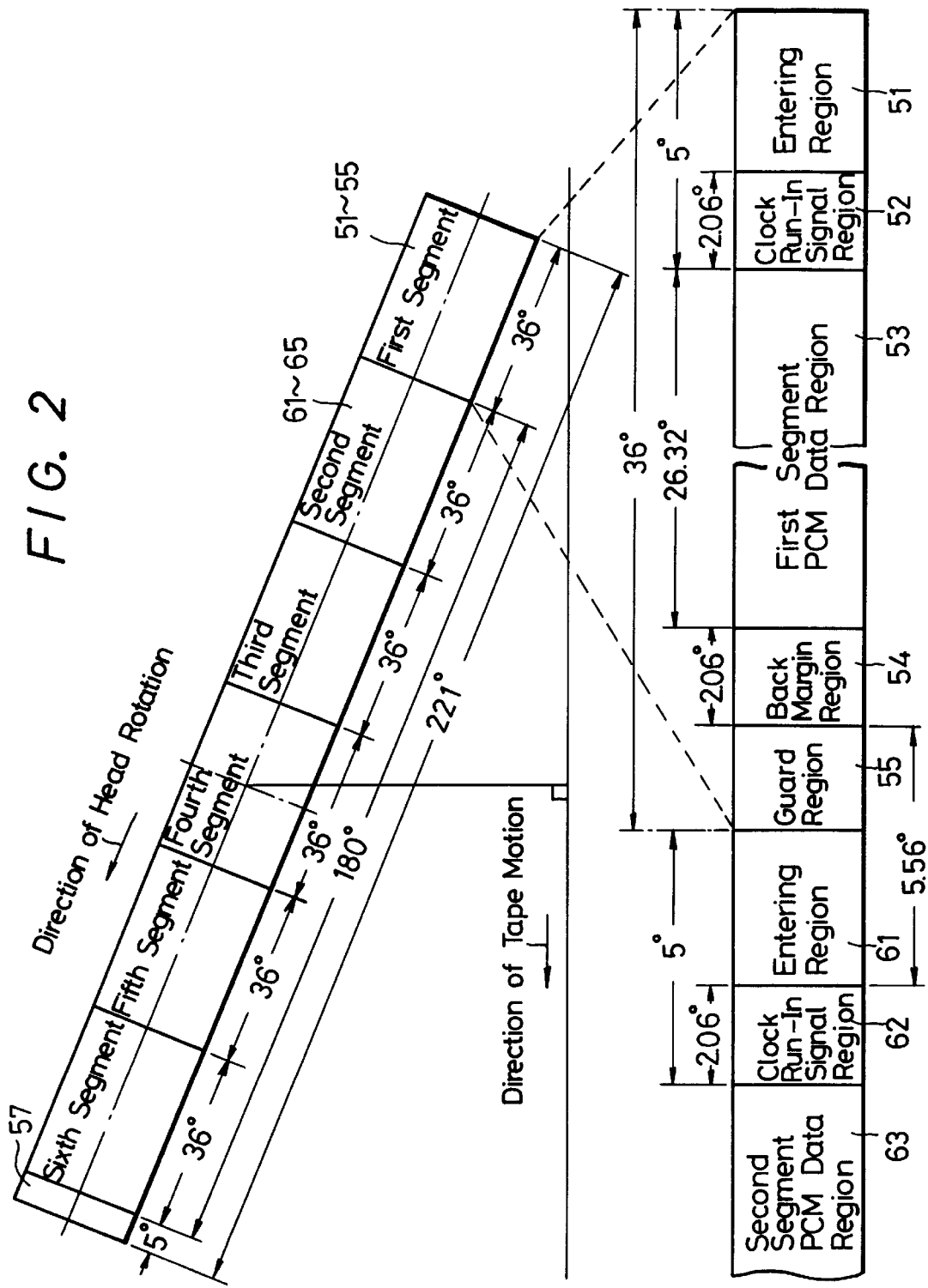

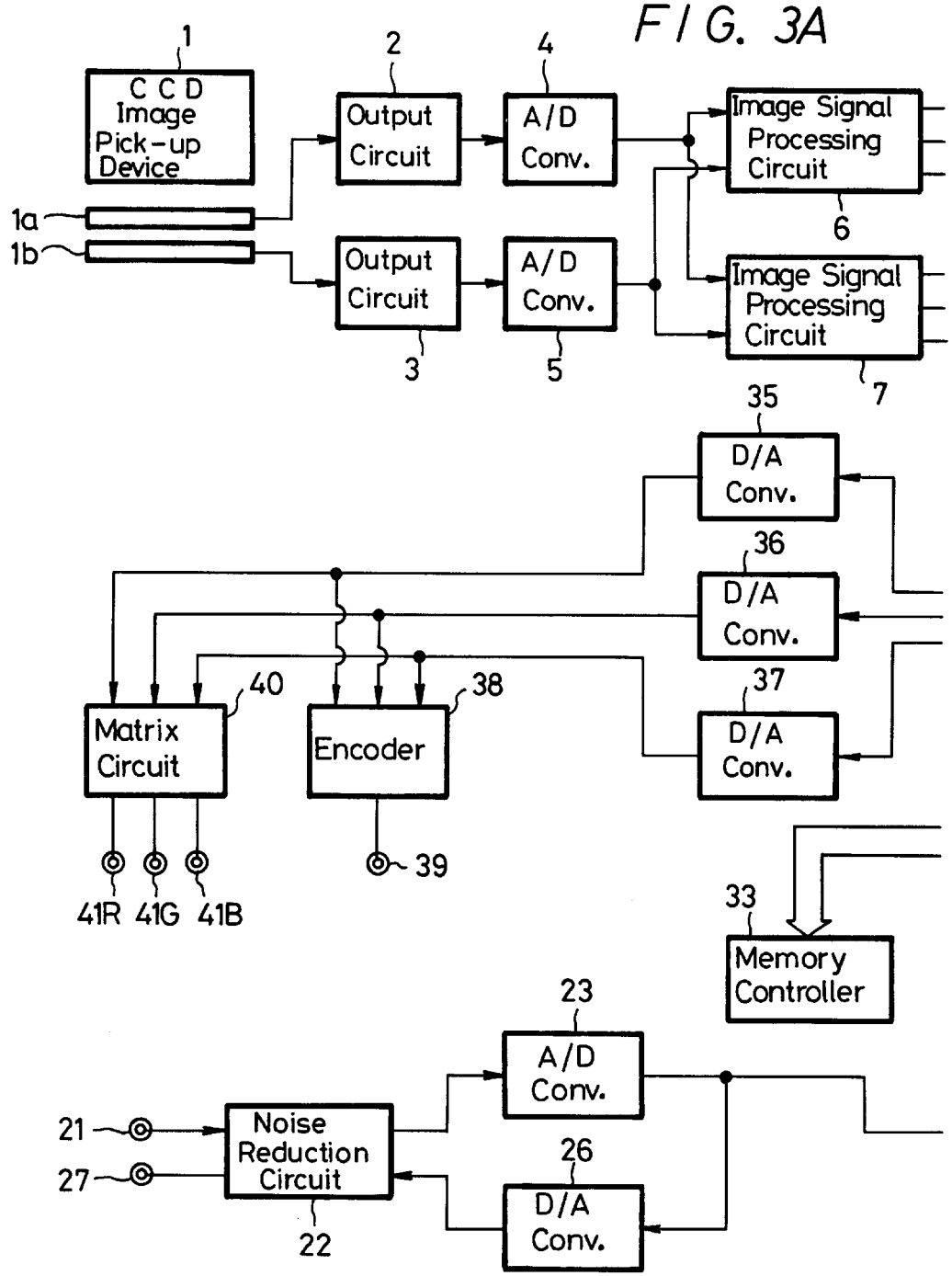

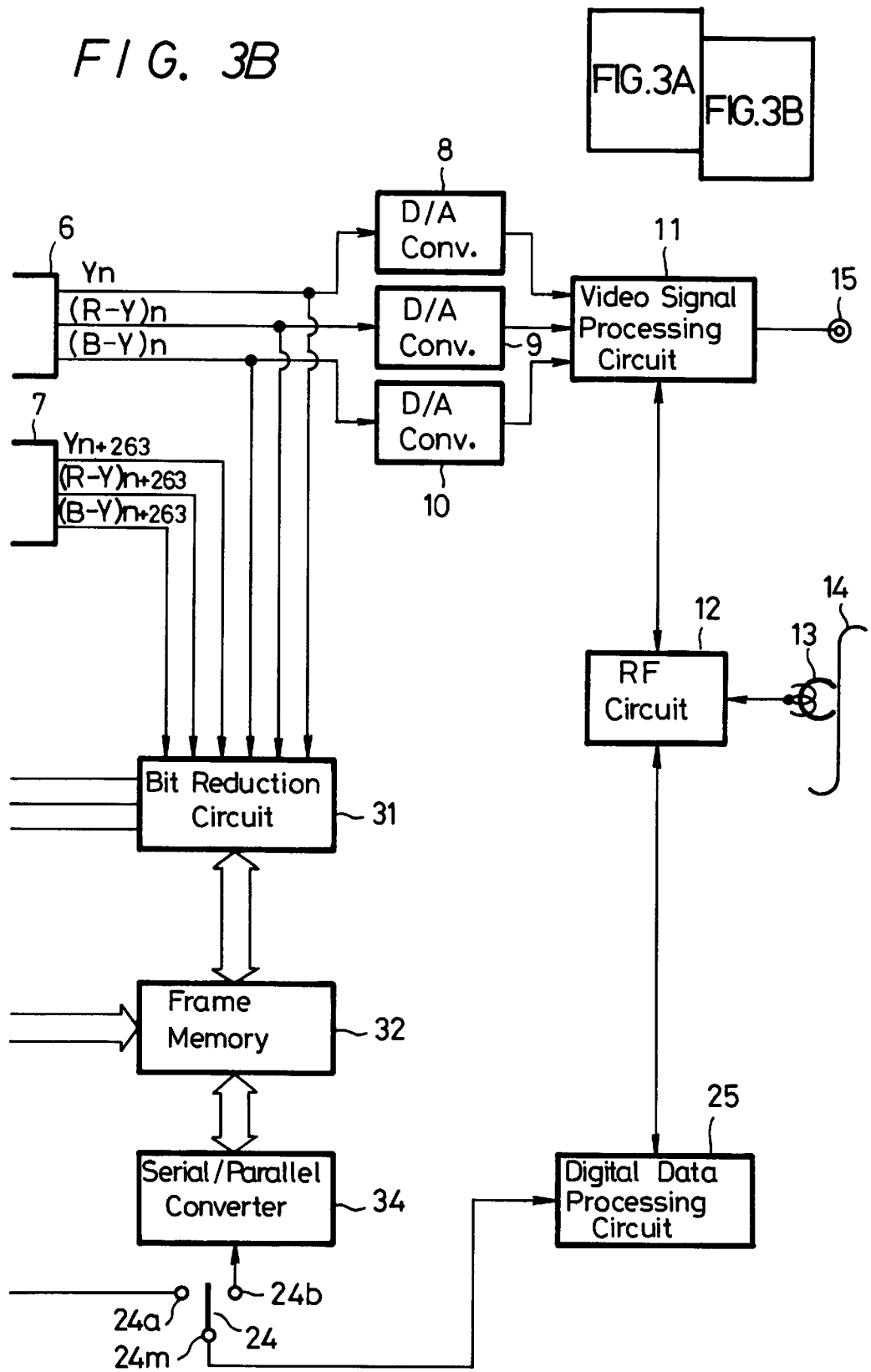

VIDEO SIGNAL RECORDING APPARATUS

This is a continuation of application Ser. No. 07/660,957, filed Feb. 26, 1991, now abandoned.

BACKGROUND OF THE INVENTION

1. Field of the Invention

The present invention relates to image signal recording and/or or reproducing apparatus suitable for use in an imaging apparatus such as a video tape recorder (hereinafter abbreviated as a VTR) having a built-in type camera.

2. Description of the Prior Art

It has previously been developed, as a recording apparatus for recording a still picture in the form of an electrical image signal, a so-called electronic still camera for recording a still picture on a magnetic disk. This electronic still camera has such an advantage that a picked up still picture can be readily viewed by merely connecting the camera to a television receiver without requiring such a processing as a development processing of a film which is required in a camera using a silver film and so on.

However, a still picture picked up by the electronic still camera is generally deteriorated in resolution when compared with that picked up by a camera using a silver film. Accordingly, it has been demanded to develop an electronic still camera capable of picking up a still picture with an improved resolution. In this case, since a magnetic disk used as a recording medium is restricted in a memory capacity etc. thereof, the electronic still camera using the magnetic disk is limited in the improvement of the resolution of the still picture.

Thus, there has been developed an electronic still camera capable of obtaining improved resolution by using a semiconductor memory as a recording medium, wherein a video signal of a picked up still picture is converted into a digital signal and the digital video signal is stored in the semiconductor memory. This type of the electronic still camera, however, requires a semiconductor memory with a large memory capacity the cost of which is expensive, and so this type of the electronic still camera has been used only for business. Now, a video tape recorder has been used widely as an imaging apparatus for home or public use and so it has been demanded to record a still picture with improved resolution by using the VTR.

OBJECTS AND SUMMARY OF THE INVENTION

Accordingly, it is an object of the presentinvention to provide a video signal recording apparatus overcoming the above described drawbacks of the conventional apparatus.

Another object of the present invention is to provide a video signal recording apparatus which is capable of recording a still picture with a high resolution with simplified constructions.

A still another object of the present invention is to provide a video signal reproducing apparatus which is capable of reproducing a still picture with a high resolution with simplified constructions.

According to a first aspect of the present invention, a video signal recording apparatus is comprised of an image memory for storing a digital signal of a still picture, a memory controller for controlling the image memory, a parallel serial converter for converting parallel data of the digital signal of a still picture read out from the image memory to serial data, a digital data processor for processing the converted serial data, and a transducer for transducing the processed serial data to a suitable form to be recorded on a predetermined recording medium.

According to a second aspect of the present invention, a video signal reproducing apparatus is comprised of a transducer for transducing information recorded on a recording medium to an electrical digital signal, a digital data processor for processing the electrical digital signal to a serial digital signal, a serial parallel converter for converting the serial digital signal to a parallel digital signal, an image memory for storing the parallel digital signal, a memory controller for controlling said image memory, a digital-to-analog converter for converting a parallel digital signal read out from the image memory into an analog signal of a still picture, and an output terminal connected to the digital-to-analog converter for outputting the analog signal of a still picture.

The above and other objects, features and advantages of the present invention will become apparent from the following detailed description of illustrative embodiments thereof to be read in conjunction with the accompanying drawings, in which like reference numerals represent the same or similar parts.

BRIEF DESCRIPTION OF THE DRAWINGS

FIG. 2 is a diagram explaining the standard of a tape track pattern of an 8 mm video tape for recording a plurality of PCM audio signals;

FIG. 3 (formed of FIGS. 3A and 3B) is a block diagram illustrating an embodiment of a video signal recording apparatus capable of recording both a moving picture and a still picture according to the present invention;

DETAILED DESCRIPTION OF THE PREFERRED EMBODIMENTS

Figure 1:
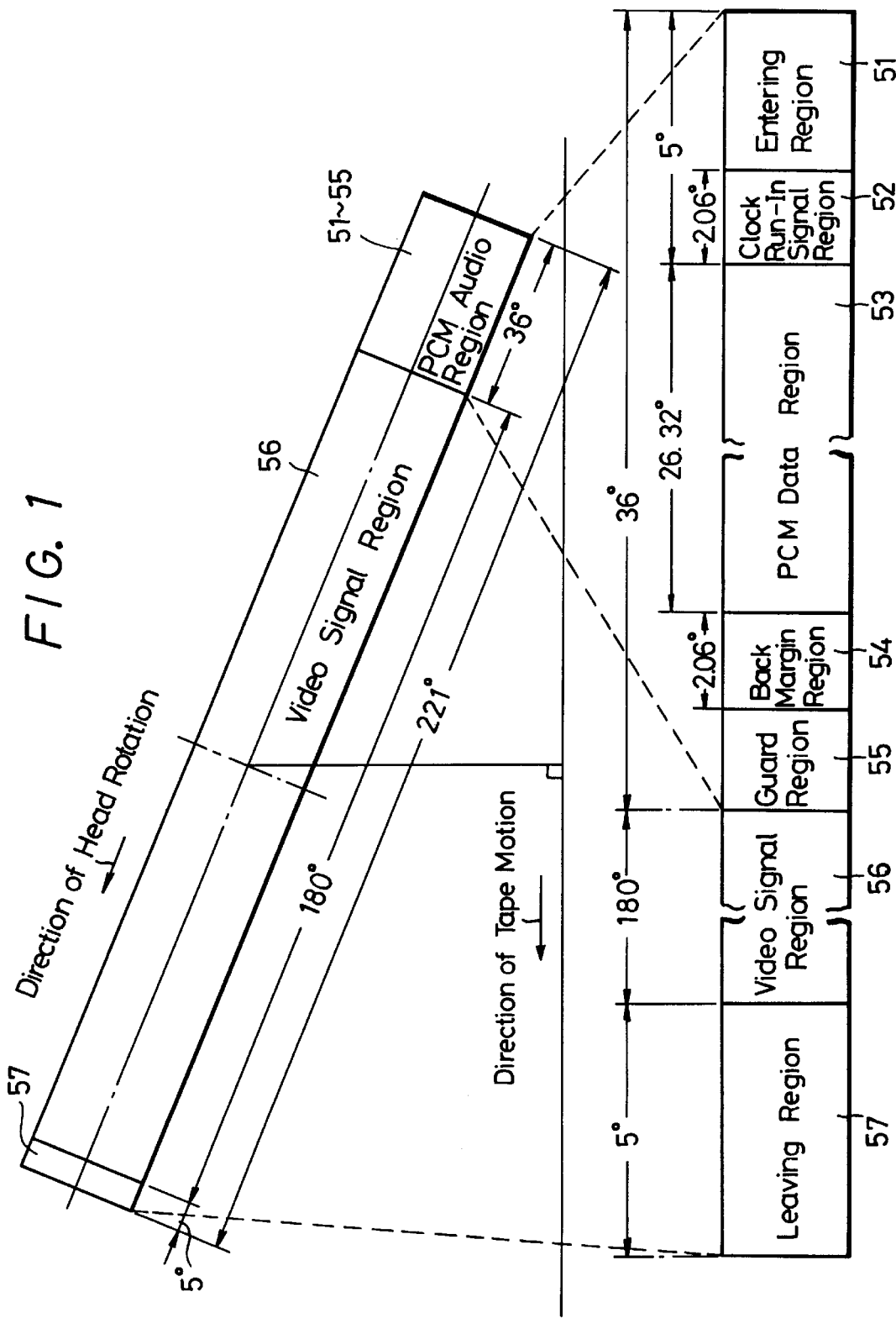
FIG. 1 is a diagram explaining the standard of a tape track pattern of an 8 mm video tape for recording a moving picture and a PCM (pulse code modulation) audio signal.

Preferred embodiments of the present invention will now be described by way of example and with reference to the accompanying drawings, wherein like reference numerals denote like or corresponding elements throughout the drawings.

The preferred embodiments of the present invention record a video signal picked up by a video camera accorded with the standard of so-called an 8 mm video tape recorder. Accordingly, prior to the description of the embodiment, the standard of a so-called an 8 mm video tape recorder will be explained hereinafter.

In this standard, recording and reproducing operations are performed by using a pair of rotary heads provided on a rotary head drum with an angular distance of 180 degrees therebetween and a magnetic tape is wound around a peripheral or head rotating surface of the drum over a range of 221 degrees. The recording and reproducing operations of a video signal on and from the tape are performed in a range of 180 degrees within the range of 221 degrees where the tape is wound, and the recording and reproducing of an audio signal, which is subjected to a time base compression after being converted into a digital signal (a pulse code modulation (PCM)), are performed in a range of 36 degrees within a remaining range of 41 degrees.

FIG. 1 is a diagram illustrating a format of a recording track on the tape accorded with the above described standard. In this format, an entering region 51 is provided in a range of 5 degrees of the head rotational angle from a portion where the head starts to contact with the tape, i.e. a right end portion in FIG. 1. At a latter half of the entering region 51 of 2.06 degrees which corresponds to three horizontal scanning periods of a video signal, there is provided a clock run-in signal region 52 synchronizing with PCM data described later. Succeeding to the clock run-in signal region 52, there is provided a PCM data region 53 in a range of 26.32 degrees wherein PCM data obtained by subjecting the audio signal to the time base compression is recorded. A back margin region 54 for compensating for deviation of a recording position due to an after-recording operation etc. is provided in a range of 2.06 degrees (corresponding to the three horizontal scanning periods) succeeding to the PCM data region 53. A guard region 55 for the guard between the PCM data region 53 and a video signal region is provided in a range of 2.62 degrees succeeding to the back margin region 54. A video signal region 56 for recording a video signal of one field is provided in a range of 180 degrees succeeding to the guard region 55, and further a leaving region 57 is provided in a range of 5 degrees succeeding to the video signal region 56.

Thus, in one track of this standard, a video signal of one field is recorded in (or reproduced from) the video signal region 56, and also the PCM data, which is obtained by subjecting an audio signal of ⅟60 second to the pulse code modulation and the error correction etc. and then subjecting to the time base compression to about ⅟6.8, is recorded in (or reproduced from) the PCM data region 53. This recording track is sequentially formed on the tape obliquely along the lengthwise direction of the tape. Thus, successive video and audio signals are recorded on and reproduced from the tape.

Now, in this standard, if the video signal region 56 is divided into five equal regions, each region has a range of just 36 degrees. Further, if the PCM data region 53, the entering region 51 of 5 degrees, the back margin region 54 of 2.06 degrees and the guard region 55 of 2.62 degrees are summed, a region of 36 degrees is obtained. In view of this fact, it is proposed to form a recording and reproducing apparatus for use only for the audio signal by using the apparatus accorded with the above described standard as described hereinafter.

FIG. 2 illustrates an example of a format of a recording track to realize this proposed recording and reproducing apparatus. In FIG. 2, an area from an entering region 51 at which the rotary head starts to contact to the tape to a guard region 55 is the same as the format of the recording track of FIG. 1 and this area is called a first segment. Further, from the starting end of a region corresponding to the video signal region 56 of FIG. 1, an entering region 61, a clock run-in signal region 62, a PCM data region 63, a back margin region 64 (not shown) and a guard region 65 (not shown) are sequentially provided to form a second segment of 36 degrees having the same construction as the first segment. In the same manner, third to sixth segments each having the same construction as the second segment are provided sequentially for every 36 degrees. A leaving region 57 of 5 degrees is provided succeeding to the sixth segment, thereby forming one recording track having six segments.

The recording of the PCM data into a desired segment is performed in a manner that the rotary angular position of the head relative to each segment is detected and the PCM data is delivered during a time period corresponding to the desired segment (period) from the position where the head starts to contact to the segment by 36 degrees each and then the PCM data is recorded while the reproduced signal is gated during that time period and the reproduction is carried out. Thus, the recording and reproducing operations of the PCM data can be performed for each segment independently.

Now, in case of recording new data on a desired segment where data was already recorded, only a so-called a flying erase head is driven during only a period wherein the head contacts with the tape corresponding to the period of the desired segment, whereby the desired segment can be selectively erased and the new data can be recorded thereon.

Thus, the PCM audio signal can be recorded and reproduced independently on and from respective segments obtained by dividing the tape into six equal regions in the width direction thereof. Accordingly, in case of recording the PCM audio data on a tape which can record the video signal for four hours, the PCM audio data can be recorded on the tape for twenty four hours which is four times as that in case of the video signal by using the format of FIG. 2.

Next, an image signal recording and reproducing section of a video camera will be explained In this embodiment, a video camera accorded with the standard of the 8 mm video tape recorder shown in FIGS. 1 and 2 is used as a recording apparatus of a still picture.

Figure 4:
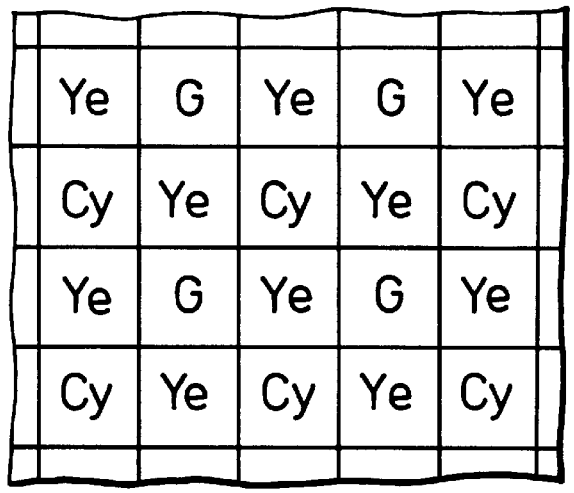
FIG. 4 is a diagram illustrating an example of a CCD (charge couple device) imager used in a video signal recording apparatus capable of recording both a moving picture and a still picture according to the present invention.

The constructions of this video camera are exemplarily shown in FIG. 3 (formed of FIGS. 3A and 3B). In FIG. 3, a reference numeral 1 denotes a charge coupled device (CCD) imager as an example of a solid image pickup device. This embodiment uses as a CCD imager 1 of a so-called all-pixel read-out type shown in Japanese Patent Laid-Open Gazette No. 1-188179, for example, which can read out an image signal of pixels on horizontal lines of odd numbers and that of pixels on horizontal lines of even numbers separately. In this type of CCD imager 1, a colour filter array composed of 494 (vertical scanning direction)×768 (horizontal scanning direction) color filters such as yellow filters Ye, green filters G and cyan filters Cy or the like arranged in a matrix pattern shown in FIG. 4 is disposed in front of the CCD imager 1 in a manner that its light receiving elements are arranged in one-to-one correspondence to the respective color filters of the color filter array so that each of the light receiving elements stores an electric signal charge generated therein in response to a color light passed through correspondent one of the color filters.

The electric signal charges stored in the light receiving elements corresponding to the horizontal scanning lines of odd numbers and those stored in the light receiving elements corresponding to the horizontal scanning lines of even numbers are respectively outputted from shift registers 1a and 1b to output circuits 2 and 3 wherein output processings such as a sample and hold processing and so on are performed. Image signals delivered from the output circuits 2 and 3 are applied to analog-to-digital (A/D) converters 4 and 5, respectively, thereby being converted into digital image signals. The digital image signals from the A/D converters 4 and 5 are respectively applied to image signal processing circuits 6 and 7 which in turn extract luminance components and colour difference components from the image signals supplied thereto. Namely, supposing that the number of horizontal scanning line of the image signals is n, the image signal processing circuit 6 extracts a luminance components Yn and colour difference components (R−Y)n and (B−Y)n, while the signal processing circuit 7 extracts a luminance component Yn+236 and color difference components (R−Y)n+236 and (B−Y)n+236. Thus, the signal processing circuits 6 and 7 simultaneously deliver signals deviated by 236 horizontal scanning lines which corresponds to one field amount. Accordingly, when the image signal processing circuit 6 delivers a luminance component and a color difference component of an image signal each of horizontal scanning lines in a field of an odd number, the image signal processing circuit 7 delivers a luminance component and a color difference components of an image signal of each of horizontal scanning lines in a field of an even number. On the contrary, when the circuit 6 delivers a luminance component and color difference components of an image signal of each of horizontal scanning lines in a field of an even number, the circuit 7 delivers those of an image signal of each of horizontal scanning lines in a field of an odd number.

The output signals Yn, (R−Y)n and (B−Y)n of the circuit 6 are applied to digital-to-analog (D/A) converters 8, 9 and 10 respectively to be converted into analog signals, which are then applied to a video signal processing circuit 11. The circuit 11 converts the applied luminance component and color difference components into a video signal accorded with the predetermined recording standard, which is then applied to a magnetic head 13 mounted on a rotary head drum through a radio frequency (RF) circuit 12 to thereby be recorded on the video signal region 56 of a track formed on a video tape 14 which is accorded with the standard of FIG. 1. In this case, the video signal of one field is recorded on one track.

The video signal reproduced from the video tape 14 by means of the head 13 is applied to the video signal processing circuit 11 through the RF circuit 12, which then delivers the reproduced video signal to an output terminal 15.

Next, the explanation will be made on an audio signal recording and reproducing section of the video camera of this embodiment.

An audio signal picked up by a microphone (not shown) is supplied to a noise reduction circuit 22 through a terminal 21. The audio signal is subjected to a noise reduction processing by the circuit 22 and then converted into an audio digital signal by an A/D converter 23 and applied to a first stationary contact 24a of a change-over switch 24. The switch 24 is constructed in a manner that a moving contact 24m thereof is connected to the first stationary contact 24a in case of recording or reproducing the digital audio signal. Thus, the digital audio signal applied to the moving contact 24m through the stationary contact 24a is applied to a digital data processing circuit 25 wherein the digital audio signal is subjected to a predetermined processing such as addition of an error correcting code and so on. The output of the digital data processing circuit 25 is applied to the magnetic head 13 through the RF circuit 12 and then recorded on the PCM data region 53 of the track formed on a video tape accorded with such standard as shown in FIG. 1.

A digital audio signal thus recorded on the video tape 14 is reproduced therefrom by the magnetic head 13 and applied to the digital data processing circuit 25 through the RF circuit 12. The reproduced digital audio signal is subjected to the error correction processing etc. by the circuit 25 and then supplied to a D/A converter 26 through the switch 24. The digital audio signal is converted into an analog audio signal by the converter 26 and then subjected to a noise reduction processing by the noise reduction circuit 22 and outputted to an audio signal output terminal 27.

Incidentally, the audio signal is usually recorded on the video tape together with a frequency modulated video signal in a frequency multiplexing manner by a circuit configuration (not shown)and so the above-described recording of the digital signal is provided optionally and selectively performed.

The explanation will be given on made about a recording and reproducing section of a still picture.

This embodiment is constructed in a manner that a digital video signal can be recorded on the PCM data region 53 in place of the digital audio signal. Namely, when a recording mode of a still picture is selected, the luminance components and the color difference components (digital signals) of the video signal delivered from the image signal processing circuits 6 and 7 are applied to a bit reduction circuit 31 wherein redundancy of the input data is shortened to one several-th. An output data from the circuit 31 is applied to a frame memory 32 and written therein at a predetermined timing. This writing operation into the memory 32 is performed separately between the luminance components Y and the color difference components (R−Y) and (B−Y). The reading and writing operations of the frame memory 32 are controlled by a memory controller 33 in such a manner that the writing to the memory 32 is performed in response to an operation of a still picture recording switch (not shown) provided on the video camera. Now, the video signal from the image signal processing circuit 6 is deviated by one field from that of the image processing circuit 7, so that they are combined to form a video signal of one frame and written in the frame memory 32. Further, the bit reduction circuit 31 makes the redundancy of the input data smaller but does not change quantity of information of the input video signal.

The video signal of one frame stored once in the frame memory 32 is read out therefrom under control of the memory controller 33 at a relatively small transmission rate substantially the same as that of digital audio signal and applied to a parallel to serial converter 34 to thereby be converted into a serial data. The serial data delivered from the converter 34 is then applied to a second stationary contact 24b of the switch 24. Now, when the video data is read out from the frame memory 32, the moving contact 24m of the switch 24 is connected to the second stationary contact 24b to thereby apply the serial data delivered from the serial parallel converter 34 to the digital data processing circuit 25. In the circuit 25, the serial data is subjected to such predetermined processing as the addition of the error correcting code in the same manner as the case of recording of the audio signal or the like and then applied to the magnetic heads 13 through the RF circuit 12 to thereby record a video signal of one frame as a still picture signal on the PCM data region 53 of the track formed on the video tape 4 accorded with such standard as shown in FIG. 1.

In this case, the capacity of data to be recorded on the PCM data region 53 of one track is small, so that the video signal of one frame is recorded over a plurality of tracks. Now, it is assumed that the recording of the digital audio data on the PCM data region 53 of one track is performed at a transmission rate of 500 kilo bits per second (KBPS), namely, the recording of 500 kilo bits is made per second and the capacity of the video signal of one frame including both the luminance and color components delivered from the video signal processing circuits 6 and 7 is 7.6 mega bits, for example, and if the capacity of the video signal is compressed to one fourth by the bit reduction circuit 31, the frame memory 32 stores the data of 1.9 mega bits as the video signal of one frame. When the video signal is recorded at the transmission rate of 500 kBPS, 1900÷500=3.8 is established. The video signal of one frame having the capacity of 1.9 mega bits will be recorded on the PCM data region 53 during a period of 3.8 seconds. This recording period of 3.8 seconds corresponds to 228 tracks and so the video signal of one frame is recorded across 228 tracks.

Next, the explanation will be made of a reproducing operation of the video signal of a still picture of one frame recorded on the PCM data region 53. At first, the digital video signal reproduced from the video tape 14 by the magnetic heads 13 is applied to the digital data processing circuit 25 through the RF circuit 12. The digital video signal is subjected to such processing as the error correction and so on by the circuit 25 and then applied to the serial parallel converter 34 through the switch 24 to convert the digital video signal into a parallel data to thereby write it in the frame memory 32 under the control of the memory controller 33. At that time, the reproduction of the video signal of one frame from the video tape is performed during a period of 3.8 seconds which is the same as that in case of recording it on the video tape.

When the video signal of one frame is written into the frame memory 32, the video signal is read out therefrom under the control of the memory controller 33 and applied to the bit reduction circuit 31, wherein the redundancy of the video signal is restored, that is, made longer to be the same as that of the output of the image signal processing circuits 6 and 7. Now, the memory 32 reads out under the control of the memory controller 33 the video signals of two fields constituting one frame alternately in the real time. Namely, the memory 32 reads out the video signal of one frame for every 1/30 second repeatedly. The restored luminance signal Y and the restored color difference signals (R–Y) and (B–Y) are respectively applied to D/A converters 35, 36 and 37 to thereby be converted into an analog luminance signal and analog color difference signals. These analog luminance and color difference signals are applied to an encoder 38, in which they are converted into a composite video signal and then applied to a monitor television receiver etc. (not shown) through an output terminal 39. The analog luminance and color difference signals from the D/A converters 35, 36, and 37 are also applied to a matrix circuit 40 to be converted into primary color signals R, G and B and the primary color signals R, G and B are applied to a monitor television receiver etc. (not shown) through output terminals 41R, 41G and 41B, respectively.

Figure 5:
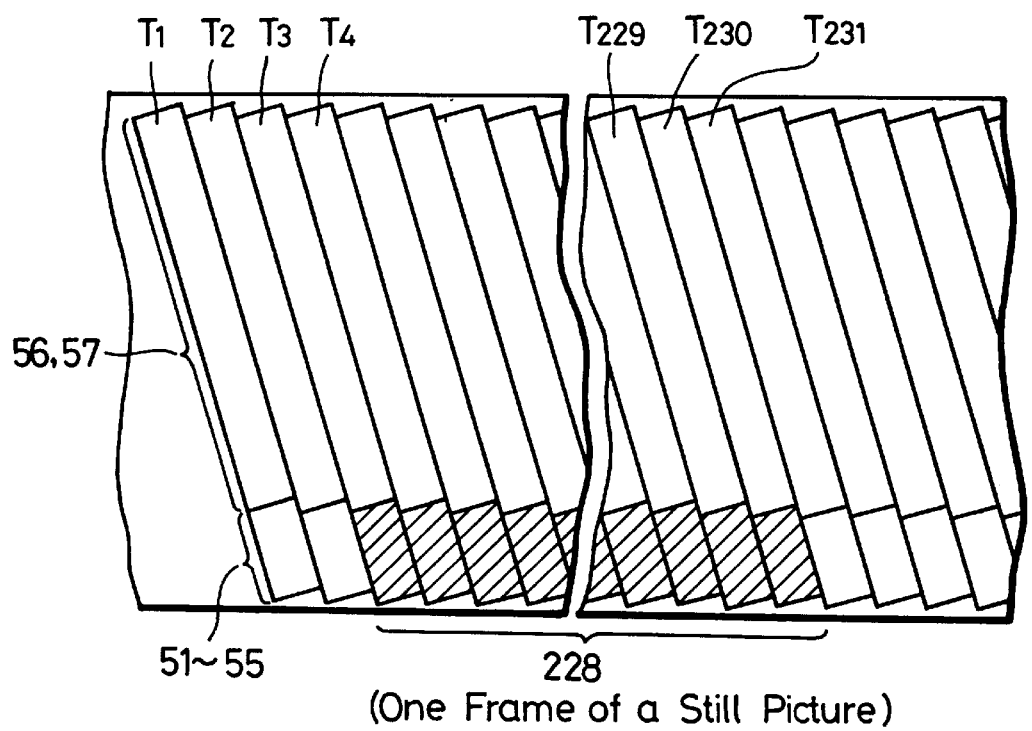
FIG. 5 is a diagram illustrating an example of a tape track pattern recorded by a video signal recording apparatus capable of recording both a moving picture and a still picture according to the present invention.

The video camera in this embodiment is thus constructed, so that it can record a still picture as a digital signal with a high resolution. Namely, in this embodiment, a digital audio signal is recorded on the PCM data region 53 of each track when the recording of the digital audio signal is selected, while a video signal of one frame is recorded as a digital signal on the PCM data region 53 of any one of the tracks at a arbitrary timing when the recording of the still picture is selected. In this case, the video camera may be provided with such a still picture recording switch that, by operating the switch when a continuous analog video signal is recorded on the video signal region 56 of each track, the video signal on a moment when the switch is operated is recorded on the PCM date region 53 as a digital signal. For example, when tracks T1, T2, T3 . . . are sequentially formed on the video tape in an ordinary recording mode of an analog video signal, if the still picture recording switch is operated at a timing where the track T3 is recorded, a digital video signal having the same image as the analog video signal to be recorded on the video signal region 56 of the track T3 is started to be recorded on the PCM data region 53 of the track T3. However, the recording of the digital video signal may be delayed by several tracks from the track T3 depending on a recording processing speed of the still picture by the circuits of FIG. 3. In this case, the digital video signal of one frame is recorded on the PCM data regions 53 of the 228 tracks from the track T3 to a track T230 as shown by a hatched area in FIG. 5, and so another digital video signal can be recorded on any ones of the tracks succeeding to the track T230.

In this exemplary embodiment, since the still picture recorded on the video tape is a digitized image signal of one frame, an output signal of the CCD imager 1 can be recorded as the still picture with little deterioration. Thus, this embodiment can reproduce a still picture with a higher resolution when compared with a case where a still picture is reproduced on the basis of an analog image signal recorded on the video signal regions 56 of respective fields and a case where a still picture is reproduced on the basis of an analog video signal of one field in such an imaging apparatus as an electronic still camera, so that a hard copy of a still picture with a high resolution can be obtained by applying the reproduced signal of a still picture to a printer such as a video printer. As described above, this embodiment is constructed to record a digital image signal by using constructions for recording a PCM audio signal of a video camera accorded with the standard of the 8 mm video tape recorder and so the digital image signal can be recorded by merely adding thereto such a circuit as the frame memory or the like to thereby simplify the constructions of the video camera as a recording and reproducing apparatus. Further, this embodiment uses, as an area of a video tape for recording a still picture, a a sub-area not used for recording an inherent image signal, so that the recording with no waste can be carried out with a high efficiency. The digital image signal of a still picture is compressed in its redundancy by the bit reduction circuit 31 before recording it on a video tape, so that quantity of data of one field is reduced to thereby perform the recording of a still picture effectively in a shorter time period. Incidentally, the bit reduction operation may be performed by the frame memory 32 instead of the bit reduction circuit 31.

The video camera of the above described embodiment is constructed to record a digital image signal of a still picture together with a continuous analog signal of a moving picture, but the video camera may be modified in a manner that a dummy video signal (e.g. a signal having only a synchronous signal but having no image information) is recorded on the video signal region 56 of a video tape and only a digital image signal as a still picture is recorded on the PCM data region 53. Alternatively, the video camera may be modified to record only a digital image signal as a still picture by using the standard of a so-called PCM of an 8 mm video tape recorder shown in FIG. 2. In this case, six channels allotted to the first to sixth segments are respectively used as six channels and respective still pictures may separately be recorded on the first to sixth segments respectively. Alternatively, a digital image signal of one frame may be recorded on the first to sixth segments of a track sequentially to thereby perform the recording of a still picture of one frame in a shorter period of time.

The above described embodiment uses, as an image pickup device equipped with a video camera, the CCD imager 1 which is able to deliver an image signal of all pixels of one frame during one field period, so that an image signal of one frame can be obtained easily. Further, this embodiment records an image signal of one frame after digitizing it. However, this embodiment may be modified to record a digital signal of only one field as a still picture when an image pickup device capable of obtaining an image signal of only one field during one field period is used. In this case, a vertical resolution of the recorded image signal is degraded to almost half of that where a digital image signal of one frame is recorded.

The above described embodiment is constructed to record an image signal picked up from a video camera as a digital image signal of a still picture, but it may be modified to record an image signal supplied from other imaging devices such as a VTR for one field or one frame.

Accordingly, the present invention can record simultaneously both an image signal of a still picture and an image signal of a moving picture efficiently by a simplified circuit configuration.

Having the described preferred embodiments of the invention with reference to the accompanying drawings, it is to be understood that the invention is not limited to those precise embodiments and that various changes and modifications thereof could be effected by one skilled in the art without departing form the spirit or scope of the novel concepts of the invention as defined in the appended claims.

We claim as our invention:

1. A video signal recording apparatus for recording on a recording medium, said recording medium recording a moving picture signal in a first area thereof, and an audio signal in a second area thereof, comprising:

image memory for storing a digital signal of a still picture;

a memory controller for controlling said image memory;

a parallel serial converter for converting parallel data of the digit signal of a still picture read out form said image memory to serial date;

a source of a digital audio signal;

switch means for alternately selecting said source of digital audio signal or the converted serial data from said parallel serial converter and for producing a selected output signal corresponding thereto;

a digital data processing means for processing said selected output signal;

a transducer for transducing processed serial data to a suitable form to be recorded in said second area of said recording medium whereby said second area stores either said audio digital signal or data corresponding to said still picture; and an analog-to-digital converter for converting an input analog video signal to a digital video signal;

image signal processing means for processing the digital video signal to generate digital luminance and chrominance signals; and a bit reduction circuit for reducing, a number of bits of output of said image signal processing means thereby to reduce redundancy of the signals produced by the image signal processing means without reducing image quality, and for storing the reduced output in said image memory.

2. A video signal recording apparatus according to claim 1, wherein said transducer is a magnetic head and said medium is a magnetic recording tape.

3. A video signal recording apparatus according to claim 1, further comprising:

a digital-to-analog converter for converting the output signal of said image signal processing means into an analog signal; and video signal processing means for processing the analog signal from said digital-to-analog converter and for supplying the processed analog signal as a signal of a moving picture to said transducer, wherein an output signal of said digital data processing means is supplied to said transducer as a signal of a still picture.

4. A video signal recording apparatus according to claim 1, further comprising an image pickup device for detecting a colour picture image of light and for supplying an image signal to said analog-to-digital converter.

5. A video signal reproducing apparatus for reproducing a still picture from signals recorded on a recording medium, said recording medium recording a moving picture signal in a first area thereof and an audio signal in a second area thereof, comprising:

a transducer for transducing information recorded on said second area of said recording medium to an electrical digital signal;

digital data processing means for processing the electric digital signal to a serial digital signal of a still picture;

a serial parallel converter for converting the serial digital signal to a parallel digital signal;

an image memory for storing the parallel digital signal;

a memory controller for controlling said image memory;

a digital-to-analog converter for converting a parallel digital signal read out from said image memory into an analog signal of a still picture;

a bit reduction circuit connected between said image memory and said digital-to-analog converter for supplying plural luminance and color difference signals to said digital-to-analog converter as said parallel signal; and an output terminal connected to said digital-to-analog converter for outputting the analog signal of a still picture.

6. A video signal reproducing apparatus according to claim 5, further comprising an encoder for encoding an output signal of said digital-to-analog converter to a composite video signal.

* * * * *